INVENTOR
B. G. COHEN
BY [signature]
ATTORNEY

United States Patent Office 3,493,443
Patented Feb. 3, 1970

3,493,443
HYPERABRUPT P-N JUNCTIONS IN SEMICONDUCTORS BY SUCCESSIVE DOUBLE DIFFUSION OF IMPURITIES

Barry G. Cohen, Berkeley Heights, N.J., assignor to Bell Telephone Laboratories, Incorporated, Murray Hill, N.J., a corporation of New York Filed May 25, 1967, Ser. No. 641,298
Int. Cl. H01l 7/44
U.S. Cl. 148—175 19 Claims

ABSTRACT OF THE DISCLOSURE

By means of the mechanism of ion-pairing, automatic reproducibility of the crucial net impurity concentration profile at hyperabrupt junctions is achieved in the method of appropriately controlled successive double diffusion of impurities into semiconductors.

BACKGROUND OF THE INVENTION

This invention relates to a method for the fabrication of electronic semiconductor diodes and other devices, by successive double diffusion of impurity dopants of opposite conductivity type into the semiconductor.

It is well known that high concentrations of impurities diffused into a semiconductor produce anomalous effects, that is, deviations from the expected resultant impurity profile predicted by a simple theory. For example, the "emitter dip effect" occurs in the manufacture of an N-P-N transistor, whereby the original collector-base junction is pushed deeper into the body of semiconductor during the subsequent diffusion of emitter-forming impurity. The explanation of this emitter dip effect appears to reside in the localized enhanced diffusion in the semiconductor caused by ion-pairing of the two types of impurities of opposite conductivity, after diffusion into the same region of the semiconductor. Whatever the explanation, the phenomenon of the emitter dip effect has been considered to be a nuisance, in that it tends to cause wider base width than desired, and to cause premature electrical breakdown during operation of the transistor.

It has long been very difficult to fabricate operable diodes of the Read type, as disclosed in Patents 2,899,652 and 2,899,646 to W. T. Read, with reliable yield by impurity diffusion methods. Such Read diodes advantageously comprise a hyperabrupt ("retrograded") junction, which is characterized on at least one side of the junction by a net concentration of one conductivity type of impurity which decreases with distance away from the junction. The difficulty in fabricating these diodes stems from the problem of reliably reproducing in the drift region the required "impurity profile," that is, net impurity concentration versus distance. This control over the impurity profile is necessary in order to obtain the electric field profile (electric field vs. distance) required under operating conditions. Relatively small errors in the concentration of impurity in the drift region near the hyperabrupt junction, lead to relatively large errors in the electric field profile, when bias voltage is applied, rendering the diode inoperative.

It is an object of the present invention to fabricate these diodes, of the Read type, reliably by successive double diffusions of properly chosen impurities of opposite conductivity type into the same portion of the surface of a semiconductor. These impurities are chosen such that they exhibit the phenomenon of ion-pairing, creating vacancies in the semiconductor, long regarded as undesirable in semiconductor devices. In this way, however, the crucial impurity profile can be reproduced reliably, without requiring close control over the individual diffusions, thereby enabling easier fabrication of operable Read diodes.

In accordance with this invention, in one specific embodiment, an epitaxial layer of relatively high resistivity P-type silicon is grown on a substrate of relatively low resistivity P-type silicon. Next, an acceptor impurity, such as boron, is diffused into the epitaxial layer in sufficient concentration near the surface to exhibit the phenomenon of ion-pairing with another impurity of opposite conductivity type, such as phosphorus, whereby vacancies in the semiconductor lattice are created. Finally, this latter impurity (phosphorus) is diffused into the epitaxial layer in sufficient concentration to form an appreciable number of ion pairs with the previously diffused impurity (boron). A hyperabrupt (retrograded) P-N junction is thereby formed, characterized by a decrease in concentration of the predominant first impurity (boron) with distance beneath the junction. An impurity profile also is thereby obtained, in which close control over the concentration of the first impurity beneath the P-N junction automatically results, but without the necessity for correspondingly close control over the diffusions. The configuration thus formed is advantageously included in a diode of the Read type.

More generally, it is an object of this invention to fabricate hyperabrupt junctions by the method of successive double diffusion of impurities into a semiconductor with automatic close control over the net impurity profile, but without requiring correspondingly close control over the individual diffusions. This is accomplished by selecting impurities for the diffusion in such a way that on-pairs will be formed in the semiconductor, which will create vacancies. Criteria for this to occur may be formulated either empirically or from theory.

Hyperabrupt junctions formed by this method of successive double diffusion with ion-pairing, are useful in any semiconductor device in which close control over the impurity profile is desired. For example, variable capacitance diodes ("varactor diodes"), the fabrication of which by a different method is described in Patent No. 3,149,395, may advantageously be formed by this method of successive double diffusion, with ion-pairing creating vacancies.

This invention, and its further objects, features, and advantages, will be more clearly understood from the following detailed description when read in conjunction with the accompanying drawings in which.

Theoretical criteria for ion-pairing with vacancy creation

1. *Interatomic Distances.*—A basic criterion for appreciable ion-pairing of two impurities of opposite type in a semiconductor, such that vacancies in the lattice are thereby produced, is that the interionic distance between the ions in a pair, consisting of one ion each of the donor and acceptor impurities, should be less than the interatomic distance between the atoms in the semiconductor lattice. Table I shows these observed atom or ion spacings.

TABLE I

| Material: | Spacing in angstroms |
|---|---|
| Silicon-silicon | 2.35 |
| Germanium-germanium | 2.44 |
| Boron-phosphorus | 1.96 |
| Boron-arsenic | 2.06 |
| Gallium-phosphorus | 2.35 |
| Aluminum-phosphorus | 2.36 |
| Aluminum-arsenic | 2.43 |
| Gallium-arsenic | 2.45 |

In order to achieve the desired objective of this invention, only those ion-pairs which produce vacancies are useful. It is these ion-pairs which cause impurities on lattice sites to move from such lattice sites into interstitial positions, thereby creating vacancies on the lattice sites, and causing the anomalous diffusion effects which are desired in this invention.

2. *Concentration of impurities.*—In order for an appreciable fraction of impurities to form ion-pairs, the concentration of these impurities must be sufficiently high. Only when ion-pairing occurs in appreciable amounts will the anomalous effects be produced which are observed in the fabrication of semiconductor devices, and which are useful in the practice of this invention.

The reaction of ion-pairing may be summarized as $$D+A=P \qquad (1)$$

where

D=donor impurity,
A=acceptor impurity,
P=ion-pair.

According to the law of mass action:

$$\frac{N_p}{(N_d-N_p)(N_a-N_p)}=\Omega(T) \qquad (2)$$

where $N_p$=number of pairs per unit volume,
$N_d$=number of donor impurities per unit volume,
$N_a$=number of acceptor impurities per unit volume; and
$\Omega(T)$, the equilibrium constant, is a function of absolute temperature, T.

In accordance with theory (Bell System Technical Journal, vol. 35, May 1956, pp. 535, 571):

$$\Omega(T)=4\pi\left(\frac{q^2}{\epsilon kT}\right)^3\int_2^\alpha \frac{e^\mu d\mu}{\mu^4} \qquad (3)$$

where $$\alpha=\frac{q^2}{\epsilon kTa}$$

$a$=equilibrium interionic distance between ions in a pair,
$q$=electronic charge on ion,
$\epsilon$=dielectric constant of the semiconductor,
$k$=Boltzmann's constant.

Figure 1:
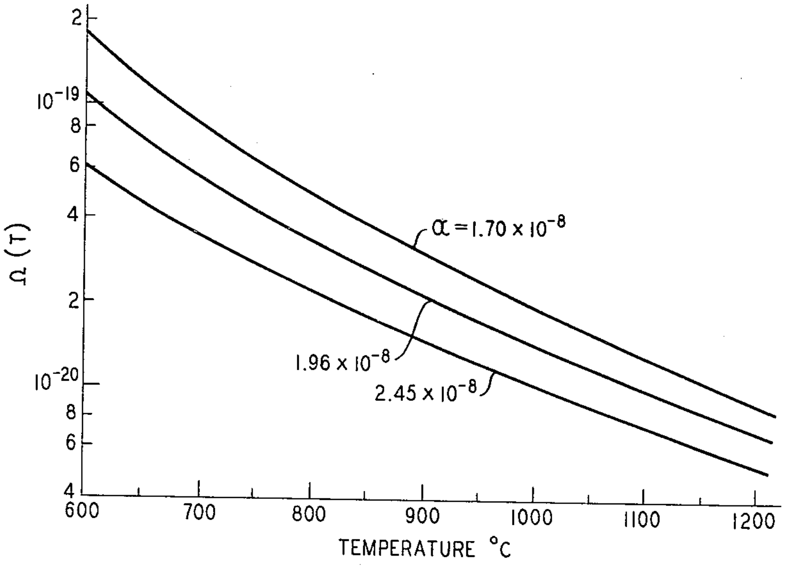
FIG. 1 is a plot of the ion-pairing equilibrium constant $\Omega(T)$ against temperature.

Values of the integral involved are known, and thus one can predict the number of ion-pairs which will form at various temperatures for given impurities in a semiconductor, FIG. 1 illustrates the value of $\Omega(T)$ versus T (converted to degrees centigrade) in the case of silicon, for which $\epsilon=12\epsilon_{vacuum}$, and for the following impurity pairs:

Lithium and boron, corresponding to $\alpha=1.70\times10^{-8}$
Boron and phosphorus, corresponding to $\alpha=1.96\times10^{-8}$
Gallium and arsenic, corresponding to $\alpha=2.45\times10^{-8}$ Note that in Equation 3 $\epsilon$ is everywhere multiplied by T. Thus any calculations for effects due to ion-pairing in a semiconductor with dielectric constant $\epsilon_1$ at a temperature $T_1$ are valid for a different semiconductor, $\epsilon_2$, at a different temperature $T_2$ satisfying $$\epsilon_1 T_1=\epsilon_2 T_2 \qquad (4)$$

provided that the interionic distance in an ion-pair is less than the interatomic distances of both semiconductors.

It is helpful to make approximations in order to achieve understanding more easily. Assuming, for example, equal concentrations of acceptor and donor impurities in Eq. 2 (which is reasonable where the normal solubilities of the two impurities are approximately equal) then the fraction, $f$, of ions paired can be calculated as a solution of $$\frac{f}{(1-f)^2}=N_d\Omega(T) \qquad (5)$$

Figure 2:
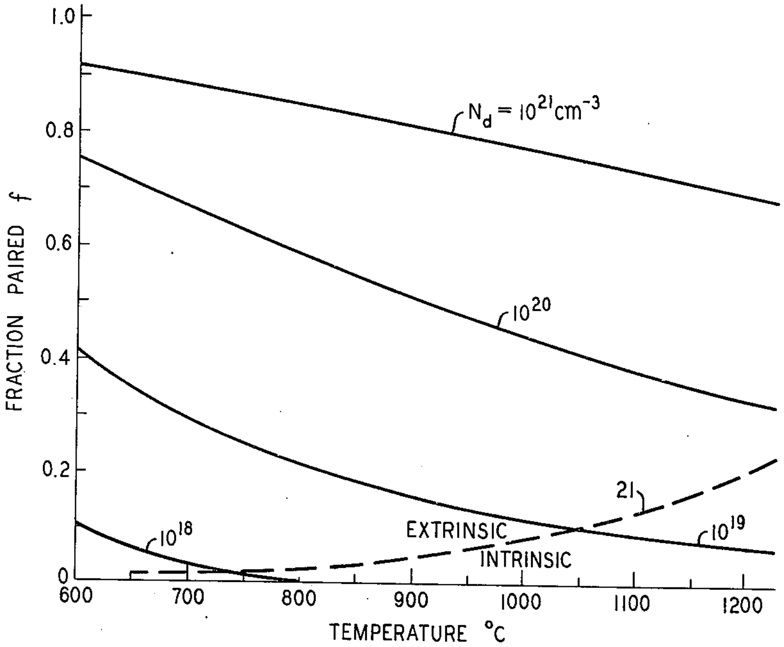
FIG. 2 is a plot of the fraction of impurities forming ion-pairs, against temperature, together with a cross-plot (dotted line) of transition from intrinsic to extrinsic type semiconductor.

The solid curves in FIG. 2 illustrate the results for the impurity pair, boron and phosphorus, at concentrations $N_d$ specified in the FIG. 2, in silicon. Again, the temperature along the abscissa has been converted to degrees centigrade. The dotted line 21 in FIG. 2 is explained below in the discussion of "Intrinsic Carrier Concentration." It is apparent from FIG. 2 that ion-pairing will be expected to occur in appreciable amounts if and when the concentration of both impurities is above $10^{19}$/cm.$^3$ at temperatures at or below 1050° C. This follows from the fact that the dotted line 21 intersects the curve corresponding to $N_d=10^{19}$/cm.$^3$ at 1050° C.

In order to apply these curves to another semiconductor say germanium or gallium arsenide (for which $$\epsilon=16\epsilon_{vacuum} \text{ and } 12\epsilon_{vacuum}$$

respectively), one need only revise the abscissa in accordance with Equation 4 above. Likewise, since $\Omega(T)$ varies slowly with the value of the equilibrium pair spacing, $a$, these curves will not be much different for other impurity pairs.

In cases where the approximation of equal concentration of impurities is not applicable, only the fraction of the more dilute impurity needs to be considered.

3. *Intrinsic carrier concentration.*—At a given temperature the semiconductor will have an intrinsic carrier concentration due to thermal agitation of electrons into the conduction band from the valence band. Then, if the semiconductor is (overall) intrinsic, the Coulomb attraction between donors and acceptors (impurities) will be reduced by these electrons in the conduction band, so that ion-pairing will not occur. Hence, in order for ion-pairing to occur, the concentration of impurities must be sufficiently high to render the semiconductor extrinsic, even at the high temperature of the diffusion furnace. In FIG. 2, the dotted line 21 (as a cross-plot) indicates transition from intrinsic to extrinsic semiconductor in silicon. The corresponding curve for germanium is similar to that for silicon at corresponding temperatures satisfying Eq. 4. It may be noted that gallium arsenide is extrinsic over substantially all the temperature and impurity concentrations shown in FIG. 2.

4. *Relaxation time.*—The curves in FIG. 2 do not take into the account the time it takes to reach equilibrium. At lower temperatures, the fraction of impurities forming ion-pairs at equilibrium is greater than at higher temperatures; therefore, after diffusion of the impurities into the semiconductor in a furnace at high temperature, still more ion pairs will be formed on cooling to room temperature. However, as the semiconductor cools, the (relaxation) time to reach equilibrium increases; so that the fraction ultimately paired is frozen at a value characteristic of some intermediate temperature, typically between 700° C and 800° C.

In order to calculate this effect or finite relaxation time during cooling, in the first approximation it is assumed that the concentration of donors is the same as acceptors. Then the relaxation time, $t_p$, for ion-pairing to reach equilibrium is given in first order kinetic theory by $$t_p = \frac{\epsilon kT}{4\pi q^2 N_d D_o} \quad (6)$$

where $D_o$=effective diffusion constant (the square root of the sum of the squares of the individual diffusion constants of each impurity).

Figure 3:
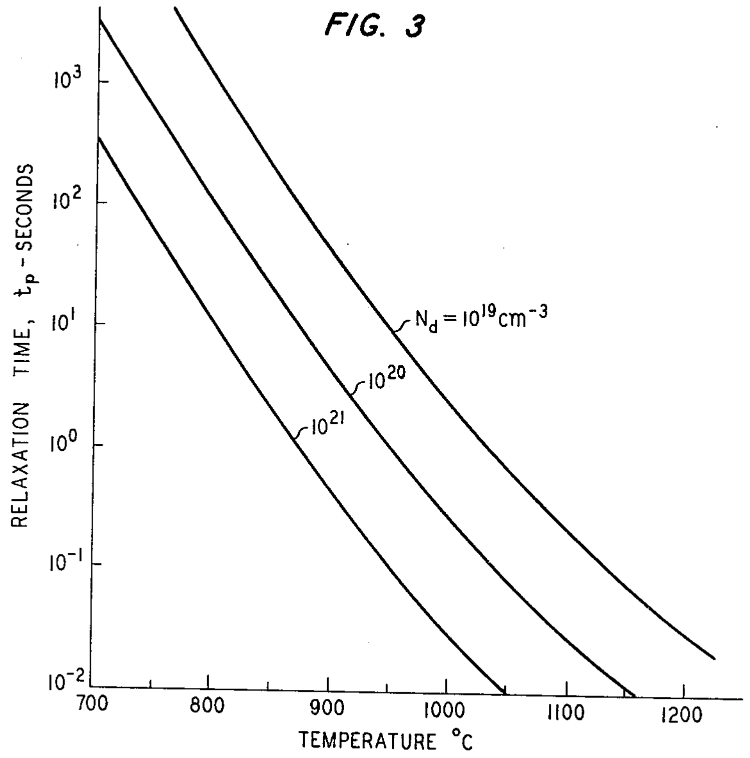
FIG. 3 is a plot of relaxation time required to form ion-pairs against temperature.

FIG. 3 gives a plot of this relaxation time versus temperature, for the case of boron and phosphorus in silicon. Again, by revising the abscissa in accordance with Eq. 4 the curves in FIG. 3 are applicable to other semi-conductors, so long as the effective diffusion constant is of the same order of magnitude.

Figure 4:
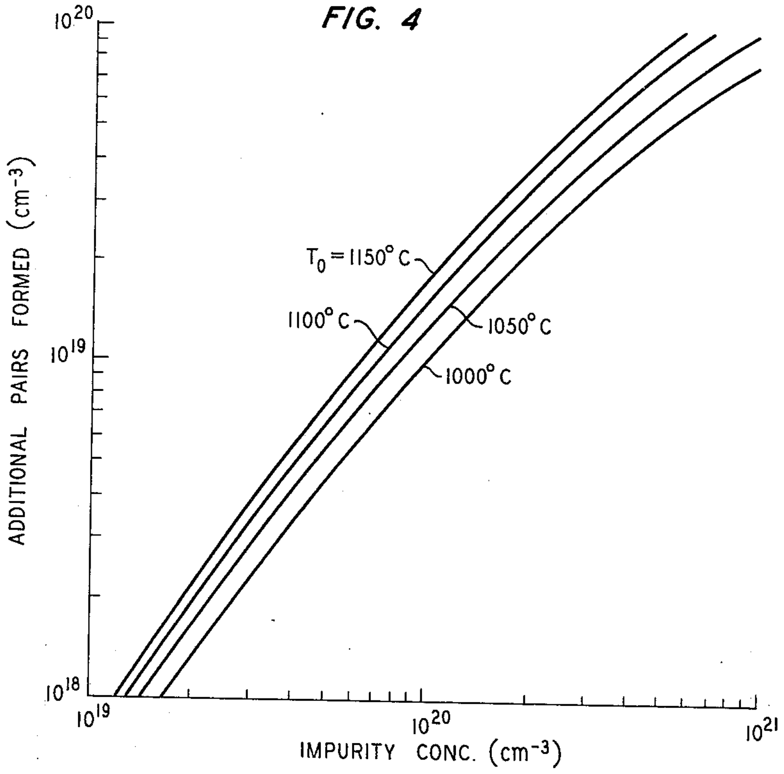
FIG. 4 is a plot of additional number of ion-pairs, formed during cooling from a temperature $T_0$, against impurity concentration.

By combining FIGS. 2 and 3, the additional number of pairs, formed during cooling, has been calculated for a typical cooling time constant of 10 seconds, from a temperature $T_0$. FIG. 4 illustrates these results. Over a wide range of conditions, including different cooling rates, it is found that the number of additional pairs formed on cooling is uniformly about 10 percent of the original number of impurities present. Thus, ion-pairing during cooling is not very sensitive to variations in diffusion and cooling conditions.

Experimental observation of ion-pairing

1. *X-ray diffraction.*—X-ray diffraction rocking curves have been obtained for diffused silicon slices. In a double crystal spectrometer, with the sample silicon crystal always in the parallel position, copper $K^{\alpha}$ radiation was used in the first order. Curves were obtained by rocking the sample crystal of silicon, plotting diffracted intensity versus angle.

Figure 5:
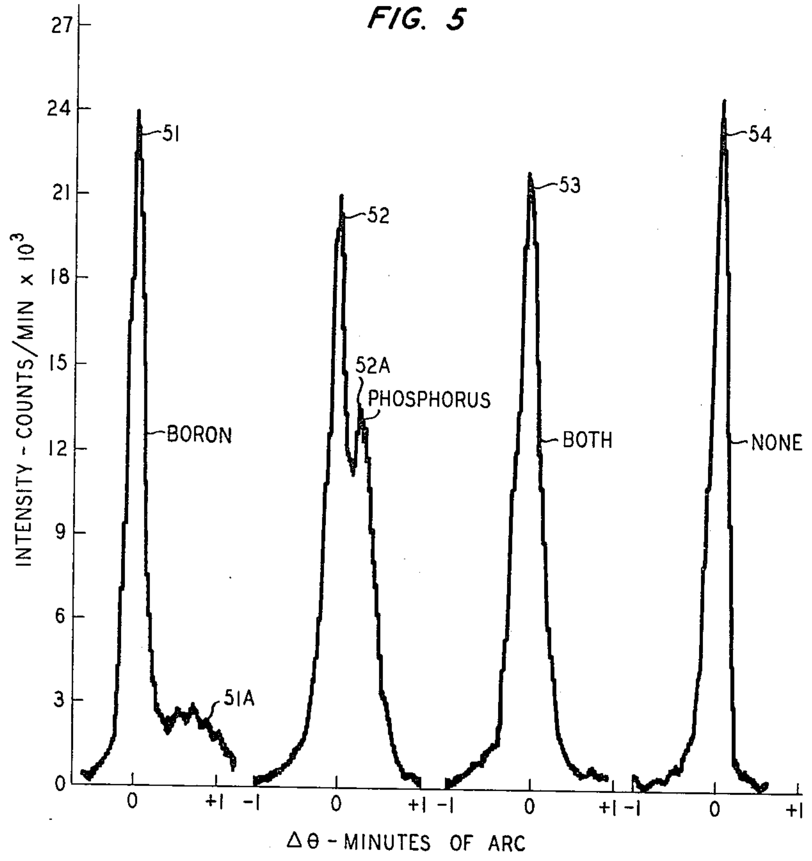
FIG. 5 is a representation of X-ray diffraction curves for double diffused, single diffused, and nondiffused semiconductor.

By the use of oxide masking, a full slice of silicon two cm. in diameter was divided into four regions. One region was diffused with boron, one with phosphorus, one with both boron and phosphorus; and one region had no diffusion. All four regions had the same oxide growths and heat treatment. A typical set of rocking curves is shown in FIG. 5. Curve 51 represents the diffracted intensity of the boron diffused region; curve 52 of the phosphorus diffused region; curve 53 of the double diffused boron and phosphorus region; and curve 54 of the region where no diffusion was performed.

The presence of the diffused layers in the sample is apparent from the satellites 51A and 52A on the high angle side of the bulk silicon line. This satellite (present only in cases of single diffusion of impurity boron or phosphorus) is due to shrinkage in the lattice constant by reason of substitutional boron or phosphorus in the lattice.

From the results shown in FIG. 5, the lattice shrinkage due to phosphorus appears less than that due to boron, in that the angular deviation of the satellite 52A is less than 51A. This result may be explained by the fact that the phosphorus was diffused first, and was later driven into the silicon during the subsequent oxidation and boron diffusion into other portions of the surface, thereby lessening the phosphorus concentration.

The region in the sample of both diffusions, corresponding to curve 53 shows the absence of any satellite. This indicates that neither the boron nor the phosphorus occurs here in high concentration in substitutional positions. Thus, in this region the boron has reacted with the previously diffused phosphorus and both ions have moved into interstitial positions in the lattice as ion-pairs, thereby reducing the impurity concentration (creating vacancies) on lattice sites.

The interstitial ion-pairs can also cause plastic deformation of the silicon, producing an elastic strain. This strain manifests itself in the broadening of the half-width of the diffraction line; that is, from 12 seconds of arc, in the undiffused region, to 19 seconds of arc, in the double diffused region. Essentially identical results are obtained if the order of the diffusions is reversed, except that now it is the boron which is driven in during the subsequent oxidation and phosphorus diffusion; so that the lattice shrinkage due to boron appears less than that due to phosphorus.

2. *Surface damage in double diffused layers.*—The presence of damage in double diffused silicon devices is well known. This damage is greatly increased for both P-N and N-P devices where the surface concentration of both impurities is above approximately $10^{19}/\text{cm.}^3$. A high etch pit count, far in excess of that attributable to the mere sum of the individual diffusions, is observed.

3. *Emitter dip effect.*—In an N-P-N transistor, the original collector-base junction is pushed deeper into the body of the semi-conductor during the subsequent diffusion of emitter-forming impurity. This effect occurs reproducibly only in N-P-N transistors. In the case of P-N-P transistors, the drawing back to N-type region into the emitter region seems to occur, rather than a pushing forward as in the case of the P-type region in the N-P-N transistor.

Application to double diffused devices

Both theory and experimental observations outlined above show that in the case of the ion-pairing of boron and phosphorus in silicon, anomalous effects are present only where the concentrations of both impurities are of the order of $10^{19}$ per cubic centimeter or greater.

In a series of double diffused phoshorus (donor) over boron (acceptor) diodes, it has been found by differential capacitance-voltage measurements that the P-type region, below the junction, has an impurity profile of the type $$N(x) = N_0 \exp(-x/L_D) \quad (7)$$

Where $N(x)$=the net concentration of acceptors at a distance $x$ below the P-N junction $$L_D = 0.12x10^{-4} \text{ cm.}$$

and $N_0 = 2 \times 10^{17}/\text{cm.}_3$.

These two parameters, $N_0$ and $L_D$, have been found to be essentially invariant over a wide range of boron and phosphorus diffusion conditions, provided the depth of the phosphorus diffusion is deeper than the original depth of the boron diffusion, and provided the impurity concentrations produced by the boron and phosphorus diffusions are high enough to cause ion-pairing above the $10^{19}$ per cm.$^3$ range. Over a wide range of such diffusion, in which the boron diffusion ranged from a depth of $0.5 \times 10^{-4}$ cm. to $2 \times 10^{-4}$ cm., the concentration $N_0$ has never been found to be outside the range $8 \times 10^{16}$ to $2 \times 10^{17}/\text{cm.}_3$.

Thus the phenomenon of ion-pairing can be used to provide automatic control over the value of $N_0$, which is essential for making operable Read diodes.

Application to Read diodes

Diodes of the Read type have been described in U.S. Patents 2,899,652, 2,899,646, and 3,270,293. Briefly the essential features of such a diode include a semi-conductor with a P-N junction, containing an avalanche region, a drift space, and an applied reverse bias voltage, that is, the P-type region is made negative with respect to the N-type region.

Figure 6:
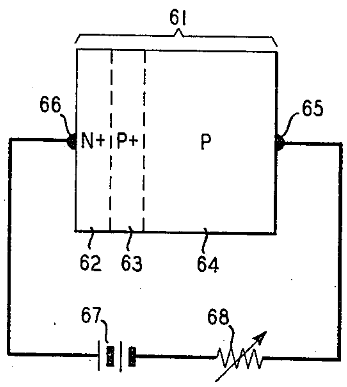
FIG. 6 is a schematic representation of a Readtype diode in an electrical circuit.

FIG. 6 diagrammatically illustrates such a device in a simple circuit. The semiconductor diode 61 has three zones of extrinsic impurity conductivity, a heavily doped N-type zone ($N^+$) 62, a heavily doped P-type zone ($P^+$) 63, and a lightly doped P-type zone (P) 64. The direct current source 67 and variable resistor 68 are connected in series with the diode by way of ohmic contacts 65 and 66. By manipulation of the variable resistor 68, the bias voltage can be varied across the diode 61. At this voltage is raised, eventually the avalanche breakdown electric field is reached in the "avalanche region" in the neighborhood of the P-N junction. Holes and electrons are thereby created. Of particular interest are the holes, which drift from the avalanche region in the zone 63 toward the ohmic contact 65, through the "drift space" of the diode in the zone 64 propelled by the electric field in this zone 64. The velocity of these holes is independent of the electric field strength in zone 63, so long as this electric field is everywhere above the so-called "critical field." Thus the carrier transit time (for holes in this case) will be given by the width of the drift space divided by the velocity corresponding to the "critical field." In accordance with Read's theory, the device will oscillate at a basic frequency F determined by:

$$2F=\frac{1}{\text{Transit time}} \qquad (8)$$

In order for this relationship to be obtained in actual operation, it is clear that when the breakdown field is reached, in the avalanche region, the electric field in the drift space must everywhere be above the critical field, or else the carriers (holes) in the drift space will not drift with a constant velocity. Scattering effects, instead of drifting, will predominate; and the output power will be greatly reduced thereby. Too high an impurity concentration in the avalanche region in zone 63, adjacent to the drift space, will cause this.

On the other hand, tool low an impurity concentration in the avalanche region in zone 63, adjacent to the drift space, will cause too high a voltage drop, hence high electric fields, in the drift space. In such a case, as the bias voltage is raised, arcing over the drift space will occur before avalanche is established in the avalanche region, thereby rendering the device inoperable. Thus, the impurity profile in the avalanche region adjacent to the drift space is a crucial factor in the operability of Read diodes.

Figures 7, 9:
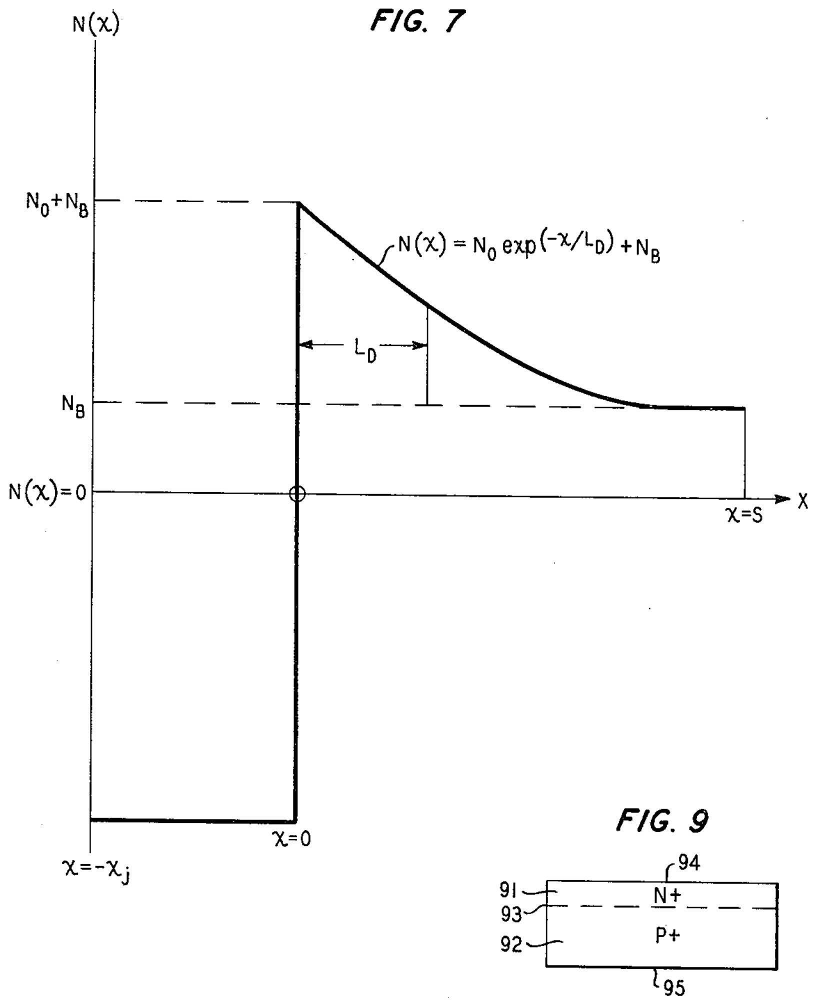
FIG. 7 is a plot of the impurity profile in a semiconductor device in accordance with this invention.
FIG. 9 is a diagram illustrating a hyperabrupt structure in a semiconductor in accordance with this invention.

An impurity profile in a semiconductor suitable for Read diodes is shown in FIG. 7. The ordinate in FIG. 7 represents net concentration of acceptor impurities, donors being counted negative. One surface of the semiconductor is represented at $x=-x_j$; the other surface is at $x=s$; and the P-N junction is at $x=0$. Such an impurity profile can be obtained in practice by starting out with a uniformly doped P-type semiconductor, with $N_B$ as the uniform "background" concentration of acceptor impurity. $N_B$ is made well below the concentration at which ion-pairing effects will occur. Thereafter, successive (double) diffusions into a selected portion of the surface of the semiconductor are carried out with further acceptor and donor impurities respectively, of the type and in sufficient concentrations such that ion-pairing occurs, creating vacanies. The concentration of the donor impurity diffusion (second diffusion) at and near the said portion of the surface of the semiconductor is made greater than that of the acceptor (first diffusion) impurity diffusion. Also, the depth of the donor impurity diffusion is made greater than the original depth of the acceptor impurity diffusion, so that ion-pairing occurs substantially throughout the original region of the first (acceptor) impurity diffusion. As a result of the second (donor) diffusion with ion-pairing creating vacancies, the impurity profile of the first (acceptor) diffused impurity is pushed deeper into the semiconductor (similar to emitter dip-effect). It is this ion-pairing reaction which accounts for the well-controlled magnitude and shape of the impurity profile in the region $x=0$ to $x=s$:

$$N(x)=N_0\ \exp(-x/L_D)+N_B \qquad (9)$$

where $N_0$=concentration of diffused acceptor impurities at the P-N junction, $x=0$. $L_D$=characteristic length of the exponential (diffusion). Eq. 9 represents the hyperabrupt (retrograded) type of junction, in that the net concentration of acceptors decreases with distance from the junction at $x=0$. The region $x=-x_j$ to $x=0$ is strongly N-type; and in FIG. 7 this region is assumed to be saturated with donor impurity, thus resulting in a flat impurity profile. However, it is not necessary to have such a flat profile by saturating the semiconductor in this region, so long as the donor concentration in this region is made so much greater than the acceptor impurity that this region is overwhelmingly of N-type conductivity.

With the impurity profile given in Eq. 9, assuming the avalanche breakdown field is reached at $x=0$, the electric field everywhere in the drift space may be calculated by means of mathematical integrations of Poisson's equation in one dimension:

$$\frac{dE(x)}{dx}=\frac{qN(x)}{\epsilon} \qquad (10)$$

where $E(x)$=electric field in the $x$ direction at position $x$
$q$=charge on each ionized impurity
$N(x)$=concentration of impurities, and
$\epsilon$=dielectric constant of the semiconductor.

In this Eq. 10, it is assumed that each impurity in the drift space is singly ionized. Such an assumption is valid only if the electric field penetrates throughout the drift space, as is desired in the Read diode. Thus, an impurity profile in the drift space suitable for Read diodes must be such that when $E(0)$ is equal to the avalanche breakdown field, $E(s)$ will advantageously be at least equal to the critical field, where $E(s)$ is obtained by integration of Eq. 10. In such a case, E will everywhere in the drift space be above the critical field, and hence more than sufficient to create a space charge. Advantageously, $E(s)$ is set equal to only slightly above the critical field, in order to keep to a minimum the total voltage across the drift space, for greater efficiency. The width of the drift region, $s$, is thus determined (through Eq. 10) by the impurity profile, and the values of $E(s)$ and $E(0)$. The impurity profile, in turn, is determined by $N_0$, $L_D$, and $N_B$; as in Eq. 9.

In the case of the diffusion of impurities into silicon, at breakdown $E(0)$ advantageously is about $4\times10^5$ volt/cm., while $E(s)$ is about $(3\times10^4)$ volt/cm.; that is, slightly above the breakdown field and the critical field, respectively. For germanium, the values of $E(0)$, and $E(s)$ are $2\times10^5$ volt/cm. and $3\times10^4$ volt/cm., respectively; for gallium arsenide, $8\times10^5$ and $3\times10^4$ volt/cm., respectively.

It should be noted, however, that in practice $s$ is much larger than $L_D$ and $N_0$ is much larger than $N_B$; so that $dE/dx$ is relatively small near $x=s$ as compared with $x=0$. This may be understood from inspection of Eq. 10: at $x=0$, $dE/dx=q(N_0+N_B)/\epsilon$; whereas near $x=s$, $dE/dx=N_B/\epsilon$. Therefore, there is much freedom in the choice of $s$ in practice; only theb ias voltage need be increased slightly, for increase in $s$. It is only the values of $N_0$ and $L_D$ which are crucial. But these are easily controlled in the ion-pairing method of this invention.

EXAMPLE

Figure 8:
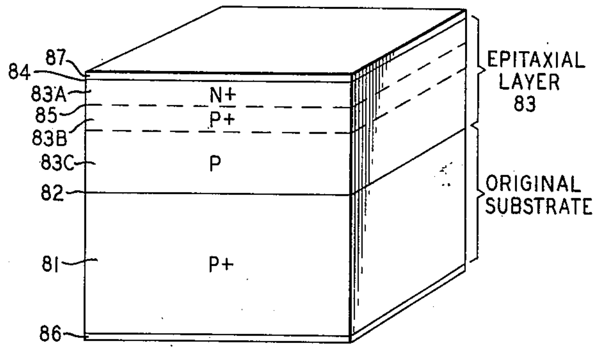
FIG. 8 is a perspective view illustrating the semiconductor structure in accordance with one specific embodiment of this invention.

FIG. 8 is a representation of a body of silicon 80 including the several conductivity-type zones in accordance with one specific embodiment of this invention. The drawing is exaggerated in certain dimensions to facilitate description.

The body of silicon 80 typically is produced by first processing a relatively large slice of silicon in accordance with the steps described below, and thereafter cutting this slice into individual pieces as represented by the element 80.

An original substrate 81 is prepared of heavily doped $P^+$ type conductivity crystalline silicon. Typically, it is made of the order of 1 mm. thick, with a uniform (acceptor) impurity concentration of the order of $5\times10^{19}$ boron atoms per $cm.^3$, by methods well-known in the art. On one portion 82 of the surface of this substrate 81, a thin epitaxial layer 83 of uniformly lightly doped P-type conductivity silicon is deposited by the method of epitaxial growth, also well-known in the art. By suitable control of this epitaxial process, the epitaxial layer 83 typically is made 4 microns thick; while the impurity concentration is kept substantially uniform throughout this epitaxial layer at a value typically about $3\times10^{15}$ boron (acceptor) atoms per $cm.^3$.

Thereafter, a first impurity (acceptor) diffusion is performed into the selected portion 84 of the usrface of the epitaxial layer 83. Advantageously, the first impurity is also boron. Typically, this boron diffusion is composed of a 30 minute predeposition at 875° C. followed by a drive-in heat treatment for 60 minutes at 1050° C. In any event, this diffusion is carried out in such a way as to result in a surface concentration of boron of about $2\times10^{19}$ atoms per $cm.^3$, and a diffusion depth of about 0.5 micron, which also can be accomplished by many techniques well-known in the art.

Then, a second (donor) impurity diffusion into the same portion 84 of the surface is then performed. Advantageously, the second impurity is phosphorus. Typically, the phosphorus is diffused for seven minutes at 1050° C. to a concentration of $7\times10^{20}$ atoms per $cm.^3$ at the portion 84 of the surface and to a depth of about one micron. During this second diffusion, ion-pairing occurs, creating vacancies.

As a consequence of these processes, the epitaxial layer 83 will then contain three main zones of conductivity, denoted by 83A, 83B, and 83C in FIG. 8. Zone 83A represents $N^+$ type conductivity semiconductor where the diffused phosphorus (donor) impurity predominates and makes the semiconductor strongly N type. Zone 83B represents $P^+$ type conductivity semiconductor, where the diffused boron (acceptor) impurity predominates and makes the semiconductor strongly P-type. Zone 83C, which serves as "drift space," is practically uniform P-type conductivity semiconductor where the resulting tail-end (with very low impurity concentration) of the boron diffusion is superimposed upon the uniformly lightly doped P-type epitaxial material. At the interface 85 between the $N^+$ and $P^+$ zones 83A and 83B, respectively, is located the resulting desired hyperabrupt junction about 0.9 micron beneath the portion 84 of the surface, created with aid of ion-pairing creating vacancies. It should be understood that the exact location of boundary between zones 83B and 83C is somewhat arbitrary, depending upon the criteria chosen for distinguishing the P from $P^+$ type conductivity.

Finally, highly conductive layers 86 and 87, for ohmic contact, are applied to the zones 81 and 83A, respectively, by techniques well-known in the art. Advantageously, for example, titanium layers about 200 angstroms thick are evaporated onto the surfaces of these zones 81 and 83A respectively. Then these titanium layers are covered with gold layers a few thousand angstroms thick.

As previously noted, the foregoing processing is advantageously performed on a relatively large wafer of silicon, which is then cut into pieces with a relatively small cross-section of the order of 5 mils square. The individual piece 80 is then mounted in a convention encapsulation device, to provide external thermal and electrical contact, as well as protection. Finally, the encapsulated diode may be mounted in a wave-guide for various purposes as an oscillator or a parametric device, as is well-known and described, for example, in U.S. Patent 3,270,293.

It should be understood that, instead of the first diffusion (boron), epitaxial growth onto the layer of uniform background acceptor impurity concentration, but with a varying epitaxial impurity concentration, may be substituted; thereby yielding substantially the same impurity profile as immediately after the first diffusion. In such a case, the top surface of this epitaxial layer would be at 84 in FIG. 8. Then only one diffusion of donor (phosphorus impurity is performed into this top surface.

Indeed, any method of preparing the semiconductor with such an acceptor impurity profile, prior to the donor (phosphorus) diffusion, is within the scope of the broadest aspect of this invention. Thereafter only one diffusion (phosphorus) is performed, as described above, into the selected portion of the surface where the acceptor impurity concentration is sufficient for ion-pairing. This one diffusion is performed to a depth in the semiconductor beneath the selected portion of its surface, greater than the "ion-pairing depth" of the acceptor impurity concentration. By "ion-pairing depth" is meant that depth, before the donor (phosphorus) diffusion, beneath the selected portion of the surface, at which the acceptor impurity concentration falls substantially below the value required for ion-pairing to occur which creates an appreciable amount of vacancies in the lattice. In view of the fact that this (phosphorus) diffusion pushes the acceptor impurity deeper into the semiconductor, the original "ion-pairing depth" (before the phosphorus diffusion) of the acceptor impurity should be made somewhat less than that of the desired hyperabrupt junction.

Likewise, it should also be understood that the original substrate 81 in FIG. 8 serves merely as a substrate for epitaxial growth of the layer 83, as well as to furnish good electrical connection between the ohmic layer 86 and the "drift space" layer 83C. The whole layer 83, prior to the two diffusion steps outlined above, could advantageously also be fabricated by any method, other than epitaxial growth, which yields the desired uniform "background" of impurity concentration. In such cases, the substrate 81 might be omitted, and the ohmic layer 86 deposited directly onto the surface 82 of the layer 83C after the two diffusions.

Although the example has been given in terms of boron and phosphorus as acceptor and donor impurities, respectively, in silicon, it is clear that this invention may be practiced with any pair of impurities of opposite type which will form an appreciable amount of ion-pairs creating vacancies in the semiconductor. The impurity used for the background, however, may be any acceptor impurity, whether or not the same as the acceptor impurity used to form ion-pairs with the donor impurity.

Although the method of fabricating hyperabrupt junctions by utilizing the effect of ion-pairing, creating vacancies, has been described in terms of application to a Read diode, it will be understood that this method may also be used to fabricate any semiconductor device in which such a hyperabrupt junction is desired, such as, but not limited to, a variable capacitance (varactor) diode. In such cases, there may be no need for the uniform background layer. The structure would be as shown in FIG. 9. Here zone 91 represents the strongly N-type region ($N^+$) produced by the donor diffusion; zone 92 represents the strongly P-type region ($P^+$) adjacent zone 91, with the junction 93 between these two zones. Contacts to portions 94 and 95 of the surface are attached after the donor diffusion step. It should be understood that not all of zone 92 need be strongly P-type, but only that portion of this zone relatively close to zone 91.

What is claimed is:

1. The method of making a hyperabrupt junction in a semiconductor including the steps of (a) preparing a semiconductor including a selected region having acceptor impurities predominating throughout, said region extending from a selected portion of the surface of the semiconductor into the interior of the semiconductor, said region having an acceptor impurity concentration at and near the said portion of the surface sufficient to have the property of forming an appreciable amount of ion-pairs with a suitable donor impurity of sufficiently high concentration, said ion-pairs having an interionic distance less than the interatomic distance in the semiconductor lattice, thereby creating vacancies in the semiconductor, and the concentration of said acceptor impurity falling to a value, at a position in the semiconductor beneath said portion of the surface which is less deep than that of the desired hyperabrupt junction, substantially below that required for said ion-pairing to occur;

(b) diffusing a donor impurity into the said portion of the surface, said donor impurity having the property of forming said ion-pairs with said acceptor impurity, to a concentration at the said portion of the surface sufficient to form said ion-pairs and substantially more than that of the acceptor impurity concentration thereat, and the concentration of said donor impurity thereby being made sufficient for forming said ion-pairs and substantially greater than the acceptor concentration (prior to the donor diffusion) to a depth beneath the selected portion of the surface at which the net acceptor concentration falls substantially below the value required for said ion-pairing to occur, whereby there is formed a P-N junction in said region beneath said portion of the surface, such that the net concentration of acceptor impurities decreases with distance away from the junction in a direction towards the interior of the semiconductor on that side of the junction where the acceptor impurity concentration predominates.

2. The method of claim 1 in which the semiconductor is silicon.

3. The method of claim 2 in which the acceptor impurity is boron and the donor impurity is phosphorus.

4. The method of claim 1 with the added step, after the diffusing of the donor impurity, of attaching a layer of highly conductive material on the selected portion of the surface.

5. The method of claim 1 in which the step (a) therein, of preparing the semiconductor consists of epitaxial growth with a varying acceptor impurity concentration in accordance with that specified in said step (a), on a P-type substrate.

6. The method of claim 1 in which step (a) therein, of preparing the semiconductor consists of diffusing the said acceptor impurity into the selected portion of the surface of the semiconductor to a concentration specified in said step (a).

7. The product prepared by the process of claim 1.

8. The method of making a semiconductor device of the type including a hyperabrupt junction together with an avalanche region and a drift space, which comprises:

(a) preparing a semiconductor crystal to have a selected region, at least a portion of the surface of said region including a portion of the surface of said semiconductor, with a uniform and relatively small background concentration of a first acceptor impurity as the predominant impurity;

(b) diffusing a second acceptor impurity into at least a portion of the said surface of the selected region, the concentration at and near the said portion of the surface thereby being made relatively high compared with the background and thereby being made sufficient to have the property of forming an appreciable amount of ion-pairs with some donor impurity of sufficiently high concentration, said ion-pairs having an interionic distance less than the interatomic distance in the semiconductor lattice, thereby creating vacancies in the semiconductor, and the concentration of said second acceptor impurity falling to a value, at a position in the semiconductor beneath said portion of the surface which is less deep than that of the desired hyperabrupt junction, substantially below that required for said ion-pairing to occur, and said second impurity concentration falling to a value at a position in the semiconductor beneath the said portion of the surface deeper than that of the desired hyperabrupt junction, substantially below that of the background concentration;

(c) diffusing a donor impurity into the said portion of the surface of the selected region, said donor impurity having the property of forming said ion-pairs with the second acceptor impurity, to a concentration at the said portion of the surface sufficient to form said ion-pairs and substantially more than that of the acceptor impurity concentration thereat, and the concentration of said donor impurity thereby being made sufficient for forming said ion-pairs and substantially greater than the acceptor impurity concentration (prior to the donor diffusion) to a depth beneath the said portion of the surface at which the net acceptor concentration falls substantially below the value required for said ion-pairing to occur, whereby there is formed a P-N junction in said region beneath the said portion of the surface, such that the net concentration of acceptor impurities decreases with distance away from the junction in a direction towards the interior of the semiconductor, on that side of the junction where the acceptor impurity concentration predominates.

9. The method of claim 8 in which the semiconductor is silicon.

10. The method of claim 9 in which both the first and second acceptor impurities are boron, and the donor impurity is phosphorus.

11. The method of claim 8 with the added step, after the step (c) therein of diffusing the donor impurity, of attaching a layer of highly conductive material on the said portion of the surface.

12. The method of claim 8 in which the step (a) therein of preparing the semiconductor consists of epitaxial growth of a layer of semiconductor with uniform first acceptor impurity concentration specified in said step (a), on a strongly P-type substrate.

13. The method of claim 12 with the added step of attaching a layer of highly conductive material to the P-type substrate, and the added step of attaching a layer of highly conductive material to the said portion of the surface after the step of diffusing the donor impurity.

14. The method of making a semiconductor device of the type including a hyperabrupt junction together with an avalanche region and a drift space, which comprises:

(a) preparing a semiconductor crystal to have a selected region, at least a portion of the surface of said region including a portion of the sruface of the said semiconductor with a uniform and relatively small background concentration of a first acceptor impurity as the predominant impurity;

(b) epitaxially growing, on at least a portion of the said surface of the selected region, a layer of semiconductor material containing a second acceptor impurity of varying concentration, the concentration of said second acceptor impurity at and near the top surface of the said epitaxial layer thereby being made relatively high compared with the background and sufficient to have the property of forming ion-pairs with some donor impurity of sufficiently high concentration, said ion-pairs having an interionic distance less than the interatomic distance in the semiconductor lattice, thereby creating vacancies in the semiconductor and the concentration of said second acceptor impurity in the epitaxial layer falling to a value, at a position beneath said top surface which is less deep than that of the desired hyperabrupt junction, substantially below that required for ion-pairing to occur, and said second impurity concentration in the epitaxial layer falling to a value, at the interface with the said surface of the selected region, substantially equal to that of the background concentration.

(c) diffusing a donor impurity into the said top surface of the epitaxial layer, said donor impurity having the property of forming said ion-pairs with the second acceptor impurity, to a concentration at the said top surface sufficient to form said ion-pairs and substantially more than that of the acceptor impurity concentration thereat, and the concentration of said donor impurity thereby being made sufficient for forming said ion-pairs and substantially greater than the acceptor impurity concentration (prior to the donor diffusion) to a depth beneath the said top surface at which the net acceptor concentration falls substantially below the value required for said ion-pairing to occur, whereby there is former a P-N junction in said epitaxial layer such that the net concentration of acceptor impurities decreases with distance away from the junction in a direction toward the interior of the epitaxial layer beneath the said top surface.

15. The method of claim 14 in which the semiconductor is silicon.

16. The method of claim 15 in which both the first and second acceptor impurities are boron, and the donor impurity is phosphorus.

17. The method of claim 14 with the added step, after step (c) therein of diffusing the donor impurity, of attaching a layer of highly conductive material to the top surface of the epitaxial layer.

18. The method of claim 14 in which the step (a) therein of preparing the semiconductor consists of epitaxial growth of a layer of semiconductor with uniform first acceptor impurity concentration specified in said step (a), on a strongly P-type substrate.

19. The method of claim 18 with the added step of attaching a layer of highly conductive material to the P-type substrate, and the added step of attaching a layer of highly conductive material to the top surface of the epitaxial layer after the step of diffusing the donor impurity.

References Cited

UNITED STATES PATENTS

| | | | |
|---|---|---|---|
| 2,819,990 | 1/1958 | Fuller et al. | 148—186 |
| 3,149,395 | 9/1964 | Bray et al. | 148—186 |
| 3,190,773 | 6/1965 | Anderson et al. | 148—189 |

L. DEWAYNE RUTLEDGE, Primary Examiner

R. A. LESTER, Assistant Examiner

U.S. Cl. X.R.

148—33, 186, 188, 189, 190; 317—234